(12) United States Patent
Bailey

(10) Patent No.: US 9,756,181 B2
(45) Date of Patent: Sep. 5, 2017

(54) PHONE NUMBER IDENTIFICATION SYSTEMS AND METHODS

(71) Applicant: Bailey Analytics, Inc., San Diego, CA (US)

(72) Inventor: Kristoffer Nicholas Bailey, San Diego, CA (US)

(73) Assignee: BAILEY ANALYTICS, INC, San Diego, CA (US)

(*) Notice: Subject to any disclaimer, the term of this patent is extended or adjusted under 35 U.S.C. 154(b) by 0 days.

(21) Appl. No.: 14/986,384

(22) Filed: Dec. 31, 2015

(65) Prior Publication Data

US 2016/0191708 A1 Jun. 30, 2016

Related U.S. Application Data

(60) Provisional application No. 62/098,569, filed on Dec. 31, 2014.

(51) Int. Cl.
*H04M 3/42* (2006.01)
*H04M 3/44* (2006.01)
*H04W 4/02* (2009.01)

(52) U.S. Cl.
CPC .......... *H04M 3/44* (2013.01); *H04M 3/4211* (2013.01); *H04M 3/42042* (2013.01); *H04M 3/42093* (2013.01); *H04M 3/42153* (2013.01); *H04M 3/42229* (2013.01); *H04M 3/42306* (2013.01); *H04M 3/42357* (2013.01); *H04W 4/02* (2013.01)

(58) Field of Classification Search
CPC ......... H04W 4/02; H04W 8/18; H04W 8/183; H04W 8/20; H04W 8/205; H04W 64/00; H04M 1/72519; H04M 1/274566; H04M 1/274575; H04M 1/274558; H04M 2207/18
USPC ............ 455/414.1, 414.2, 456.1, 456.2, 564, 455/550.1
See application file for complete search history.

(56) References Cited

U.S. PATENT DOCUMENTS

| | | | |
|---|---|---|---|
| 2007/0129063 A1* | 6/2007 | Recio | H04M 1/274516 455/414.1 |
| 2014/0148136 A1* | 5/2014 | Thange | H04M 3/4228 455/414.1 |
| 2016/0044166 A1* | 2/2016 | Thange | H04M 3/4228 455/414.1 |

* cited by examiner

*Primary Examiner* — Temica M Beamer
(74) *Attorney, Agent, or Firm* — Richards Patent Law P.C.

(57) ABSTRACT

A system for initiating phone calls includes a database including records related to one or more second users, each of the second users being associated with an identifier and a phone number, a phone including a controller in communication with the database, and a memory in communication with the controller. The memory including program instructions executable by the controller that, when executed by the controller, cause the controller to provide a user interface that receives a phone call request from a first user, wherein the phone call request includes the identifier associated with a one of the second users and does not include the phone number associated with the one of the second users, and, in response to receiving the phone call request, initiating the phone call over a telephone network from the phone to the phone number associated with the one of the second users.

14 Claims, 13 Drawing Sheets

Delta Airlines – Too many departments to remember

| | |
|---|---|
| General Number: | 1-800-221-1212 |
| Reservations (Spanish): | 1-800-511-9629 |
| Reservations (Japanese): | 1-800-327-2850 |
| Website Issues: | 1-888-750-3284 |
| Customer Care: | 1-800-455-2720 |
| Disability Assistance: | 1-404-209-3434 |
| SkyMiles Representative: | 1-800-323-2323 |
| Delta Cargo: | 1-800-352-2746 |
| Delta Cares (bereavement): | 1-800-352-2737 |
| Delta Private Jets: | 1-800-927-0927 |
| Delta Media Inquiries: | 1-404-715-2554 |
| International Sales: | 1-800-241-4141 | identifier with an extension key directs calls to each department
(autofill as you type – directs you to available departments)

| | |
|---|---|
| General Number: | *delta  ⟵174 |
| Reservations (Spanish): | *delta.spanish |
| Reservations (Japanese): | *delta.japanese |
| Online Support: | *delta.online |
| Customer Service: | *delta.customer |
| Disability Assistance: | *delta.disability |
| SkyMiles Representative: | *delta.skymiles |
| Delta Cargo: | *delta.cargo |
| Delta Cares (bereavement): | *delta.cares |
| Delta Private Jets: | *delta.private |
| Delta Media Inquiries: | *delta.media |
| International Sales: | *delta.international |

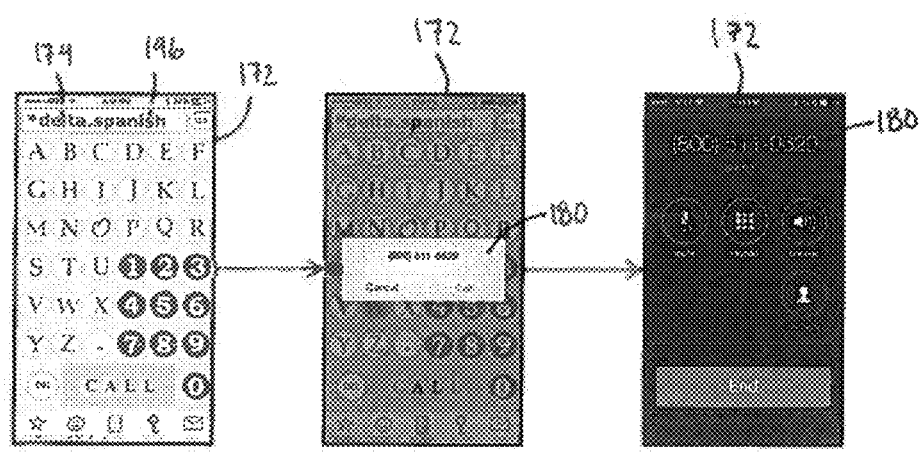

Fig. 19 phone calls based on the identifier alone. Various examples of the systems and methods are provided herein.

The system of the present application includes a mobile device, a controller on the mobile device, a server in communication with the controller, and a database of records of information related to the users in communication with the server. A first or call initiating user inputs the identifier of a second or call-receiving user into the application and submits a phone call request. The controller sends the phone call request to the server, and the server scans the database to identify the phone number associated with the second user and provides the phone number to the controller. The controller then initiates a phone call from the first user's mobile device to the phone number of the second user over a telephone network.

In one embodiment, a system for initiating phone calls includes a database including records related to one or more second users, each of the second users being associated with an identifier and a phone number, a phone including a controller in communication with the database, and a memory in communication with the controller. The memory including program instructions executable by the controller that, when executed by the controller, cause the controller to provide a user interface that receives a phone call request from a first user, wherein the phone call request includes the identifier associated with a one of the second users and does not include the phone number associated with the one of the second users, and, in response to receiving the phone call request, initiating the phone call over a telephone network from the phone to the phone number associated with the one of the second users.

In some embodiments, the database further includes one or more personal keys associated with one or more of the first and second users. In other embodiments, the database includes an identifier for a business having a plurality of locations and one or more location keys corresponding to each of the plurality of locations. Each location key is a zip code associated with each location.

In another embodiment, the controller communicates with a global positioning system subsystem (GPS subsystem) of the phone, in response to receiving the identifier associated with the business having a plurality of locations the controller automatically includes a location key associated with a GPS location identified by the GPS subsystem in the phone call request. In response to receiving the phone call request including the location key, the controller initiates a phone call from the phone to a phone number associated with the business location associated with the location key.

In a further embodiment, the controller is in communication with a second user contact list for each of one or more of the second users, each of the second user contact lists including identifiers of a subset of the first and second users. Initiating the phone call further includes the controller blocking the identifier of the first user from the second user if the first user is not in the second user contact list associated with the one of the second users to which the call is directed. In other embodiments, the phone is in communication with the database via a wireless communication network.

In another embodiment, a method of initiating phone calls includes providing a system comprising a database including records related to one or more call receiving users, each of the call receiving users being associated with an identifier and a phone number and a phone including a controller in communication with the database. The method further includes the steps of receiving a phone call request from a call initiating user, wherein the phone call request includes

PHONE NUMBER IDENTIFICATION SYSTEMS AND METHODS

CROSS-REFERENCE TO RELATED APPLICATIONS

This application incorporates by reference and claims the benefit of priority to U.S. Provisional Application Patent No. 62/098,569 filed Dec. 31, 2014.

BACKGROUND OF THE INVENTION

The present subject matter relates generally to a universal phone number system that provides a layer of privacy for individuals and promotes publicity for franchises and corporations.

Phone numbers are difficult to remember and recall when needed, even more so for children and seniors. Typically, individuals use their cell phones as an address book. Instead of dialing full ten digit phone numbers, individuals typically just select a name from their address book to call. Upon selection of a contact in their address book, the contact's phone number is automatically dialed. However, address books in cell phones may be damaged and/or the phone may be lost.

Further, contact lists contained in cell phones only contain contacts for which the individual knows. If the individual wants to call a business for an appointment, the individual would need to find the number by searching the web or calling information, write the number down, and then dial the number.

Phone directories in print and online are inconvenient to access and often contain phone numbers that are not up-to-date. Further phone directories by nature publicly disclose telephone numbers and many individuals would rather not have their personal information publicly disclosed, but would still like their phone numbers available to friends and family they trust. Currently, individuals must choose between (1) opting out of the phone book and having their number unavailable to everyone or (2) opting into the phone book and disclosing their private information to the public.

Further people frequently change jobs and locations, resulting in a change in home or work phone numbers. Individuals must then contact every one of the people in their address book in order to update them on their new phone number. Updating numerous people of a user's new phone number is an inconvenient and laborious task.

Business phone numbers are often difficult to advertise, much less memorize. For example, cab companies often display their business phone number on the side of the cab, which is difficult for customers to access and memorize.

Accordingly, there is a need for a system that protects user's private information by not disclosing their phone numbers but yet allows the user to disclose a method of reaching the user by phone. Further, there is a need for a system that eliminates the need to remember or record ten digit telephone numbers and provides an easy system to contact people by phone.

BRIEF SUMMARY OF THE INVENTION

The present disclosure addresses the above-noted needs by providing phone number identification systems and methods that allow a user to call another user without requiring the other user's phone number. Each user has an associated identifier and phone number, and users initiate the identifier of the associated with a one of the call receiving users and does not include the phone number associated with the one of the call receiving users and initiating the phone call over a telephonic network from the phone to the phone number of the one of the call receiving users.

In a further embodiment, the method further comprises the step of updating the phone number associated with the one of the call receiving users.

In another embodiment, the controller is in communication with a call receiving user contact list for each of one or more call receiving users, each of the call receiving user contact lists including identifiers of a subset of the call initiating and call receiving users. The method further comprises the step of providing the identifier of the call initiating user to the call receiving user after the connecting step if the call initiating user is on the call receiving user contact list.

In a further embodiment, the method includes the step of blocking the identifier of the first user to the second user after the connecting step if the call initiating user is not on the call receiving user contact list.

In another embodiment, an additional user has a personal key and the phone call request further includes the identifier of the call initiating user and the personal key of the additional user. The method further includes the step of providing the identifier of the call initiating user to the call receiving user after the connecting step if the additional user is on the call receiving user contact list.

Using the systems and methods described herein, users input only the identifier of other users to initiate the phone call. Users can control privacy settings of each associated phone number as well as access that other callers have to personal information.

Businesses can use the system to allow consumers to access employees and departments directly and easily. Franchises can use the system to allow users to contact nearby locations. Businesses and celebrities can use the system for advertising purposes.

An advantage of the present systems and methods is providing users with the ability to call other users without needing to remember a large amount of contact information and/or phone numbers.

Another advantage of the present systems and methods is providing a system that discourages unknown callers from calling individuals and that provides users with options for handling calls from unknown callers.

Another advantage of the present systems and methods is allowing businesses to create memorable user identifications that correspond with various locations or departments.

Yet another advantage of the present systems and methods is allowing users to share a user name or identification to the public while maintaining the privacy of their personal information.

BRIEF DESCRIPTION OF THE DRAWINGS

FIG. 16 is an illustration of embodiments of a series of user interfaces illustrating the default use of a location key based on the global positioning system of the call-initiating user's phone.

FIGS. 17 and 18 is a list of departments within Delta Airlines and the corresponding phone numbers and extension keys, respectively.

FIG. 19 is an illustration of embodiments of a series of user interfaces illustrating the use of a department as an extension key.

DETAILED DESCRIPTION OF THE INVENTION

The present disclosure provides phone number identification systems and methods for initiating phone calls in which a first user, or a call-initiating user, initiates a phone call to a second user, or call-receiving user, using an identifier other than the second user's actual phone number. When embodied in a mobile application on a mobile device, the systems and methods enable the first user to initiate a phone call request to a second user using the second user's identifier (not the second user's phone number) and the controller in the mobile device initiates a phone call to a phone number associated with the second user over a telephone network. Accordingly, the subject matter taught herein teaching systems and methods that allow users to phone other users without needing to directly access phone numbers. Additional functions related to automatically screening and redirecting calls to the appropriate recipients, based on the use of personal keys, location keys, and the like are provided herein. Various implementations will provide advantages as described below.

Although the features and functions described herein may be embodied in various forms, for clarity and continuity of the description, the primary examples provided herein are described with reference to the use of a mobile device to place a phone call to another mobile device or other phone line. However, it is understood that the features and functions described herein may be embodied in any device that initiates phone calls through a public telephone network. For example, the device used to initiate the phone call may be a VoIP phone.

Figure 1:
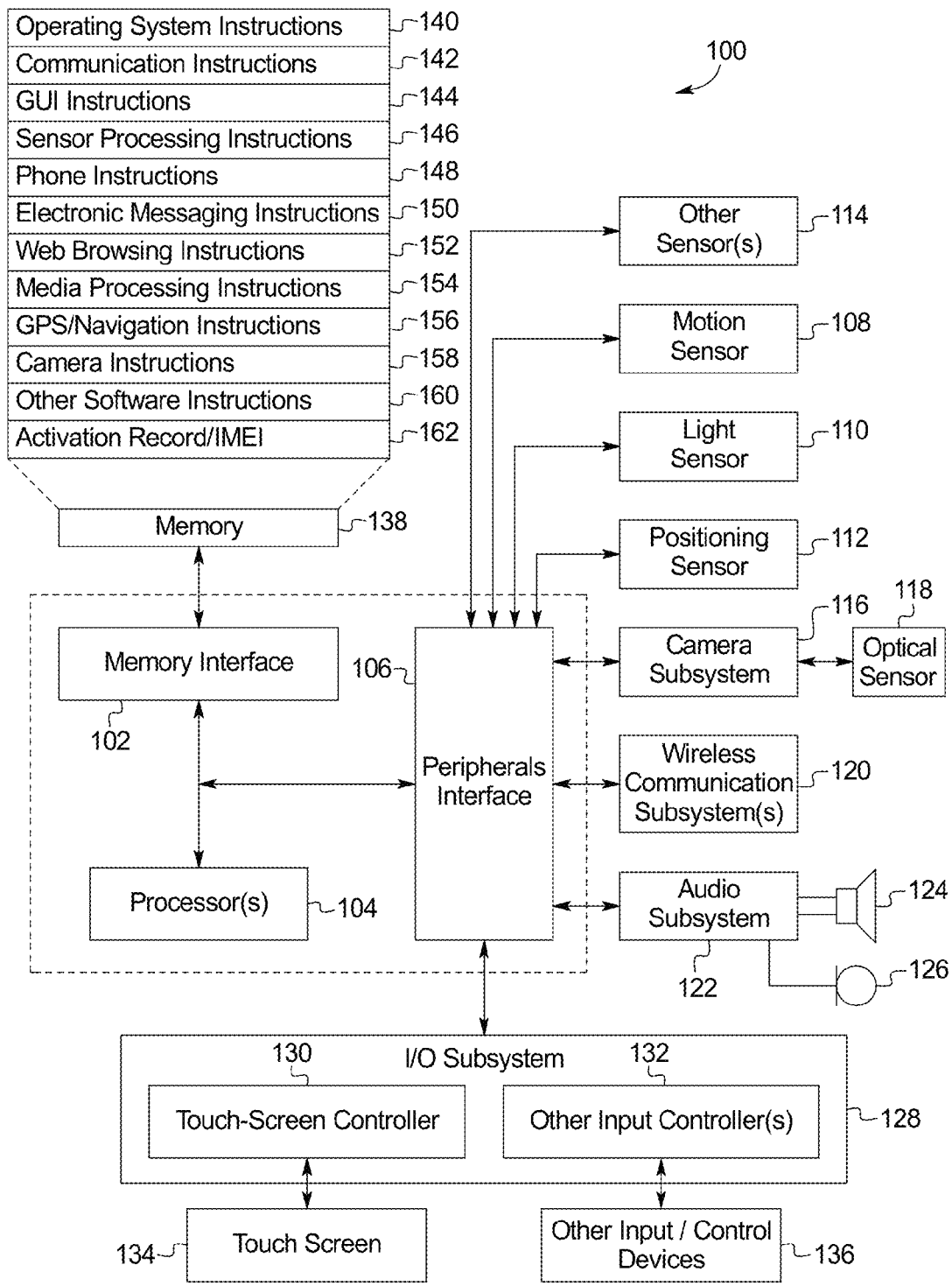
FIG. 1 is a block diagram of a mobile device that may embody the systems and methods described herein.

FIG. 1 is a block diagram of a mobile device 100. The mobile device 100 shown in FIG. 1 includes a memory interface 102, one or more data processors, image processors and/or central processors 104 (controller 104), and a peripherals interface 106. The memory interface 102, the one or more processors 104 and/or the peripherals interface 106 can be separate components or can be integrated in one or more integrated circuits. The various components in the mobile device 100 can be coupled by one or more communication buses or signal lines, as will be recognized by those skilled in the art.

Sensors, devices, and additional subsystems can be coupled to the peripherals interface 106 to facilitate various functionalities. For example, a motion sensor 108, a light sensor 110, and a positioning sensor 112 (e.g., GPS receiver) can be coupled to the peripherals interface 106 to facilitate any orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the mobile device 100 is intended to operate. For example, the mobile device 100 can include communication subsystems 120 designed to operate over a GSM network, a GPRS network, an EDGE network, an LTE network, an LTE Advanced network, a Wi-Fi or WiMax network, and a Bluetooth™ network. In particular, the wireless communication subsystems 120 may include hosting protocols such that the mobile device 100 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 can include a touch screen controller 130 and/or other input controller(s) 132. The touch-screen controller 130 can be coupled to a touch screen 134. The touch screen 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 can be coupled to memory 138. The memory 138 can include high-speed random access memory and/or non-volatile memory, such as one or more magnetic disk storage devices, one or more optical storage devices, and/or flash memory (e.g., NAND, NOR). The memory 138 can store operating system instructions 140, such as Darwin, RTXC, LINUX, UNIX, OS X, iOS, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 138 may also store communication instructions 142 to facilitate communicating with one or more additional devices, one or more computers and/or one or more servers. The memory 138 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 138 may also store other software instructions (not shown) controlling other processes and functions of the mobile device 100 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 138.

Figure 2:
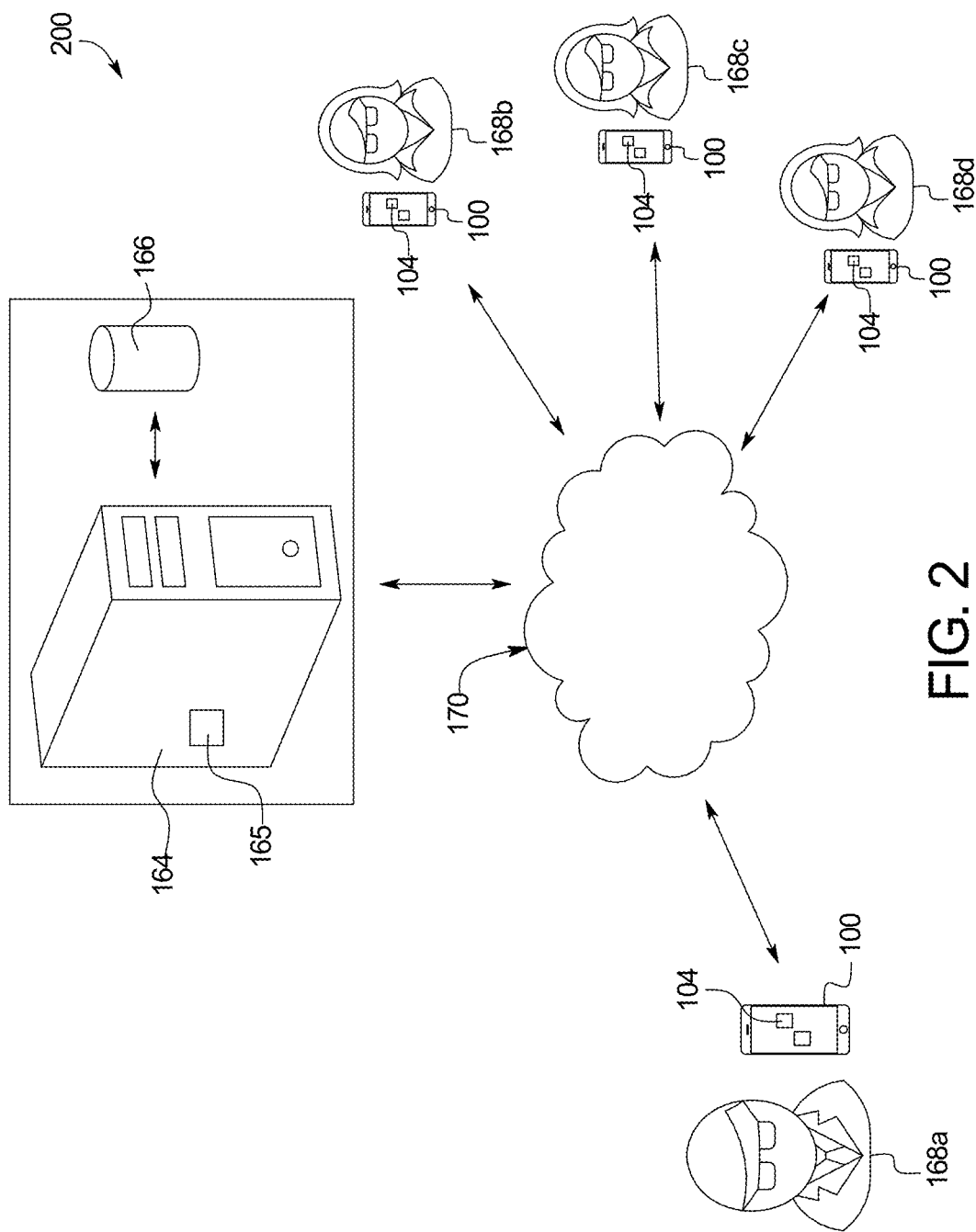
FIG. 2 is a schematic representation of an embodiment of the system of the present invention.

Referring to FIG. 2, the system 200 of the present application includes the mobile device 100, a server 164 including a server controller 165, and a database 166. The database 164 includes records related to users 168 of the mobile application, and each user 168, including the first user 168a, or call-initiating user 168a, and one or more second users 168b-168d, or call-receiving users 168b-168d, is associated with an identifier and a phone number. The controller 104 on the mobile phone 100 uses the phone instructions 148 to control the wireless communications subsystem(s) 120 and audio subsystem 122 to carry out the processes described herein. The system 200 enables a call-initiating user 168a to initiate a phone call to a call-receiving user 168b-168d by providing the identifier, but not the phone number of the call-receiving user 168b-168d. In an example embodiment, the identifier is a *(username). For example, a user named Robert may select the identifier "*robert".

Specifically, the memory 138 in communication with the controller 104 includes program instructions (e.g., phone instructions 148) that, when executed by the controller 104, causes the controller 104 to provide a user interface 172 that receives a phone call request from a first user 168a. The phone call request includes the identifier associated with a second user 168b-168d and does not include the phone number associated with the second user 168b-168d. In response to receiving the phone call request, the controller 104 initiates the phone call over a telephone network 170 from the mobile device 100 to the phone number associated with the second user 168b-168d.

The telephone network 170 through which the phone call is initiated includes existing infrastructure such as telephone lines, fiber optic cables, cellular networks, communication satellites, and any other telephone network infrastructure for public telecommunication.

Figure 3:
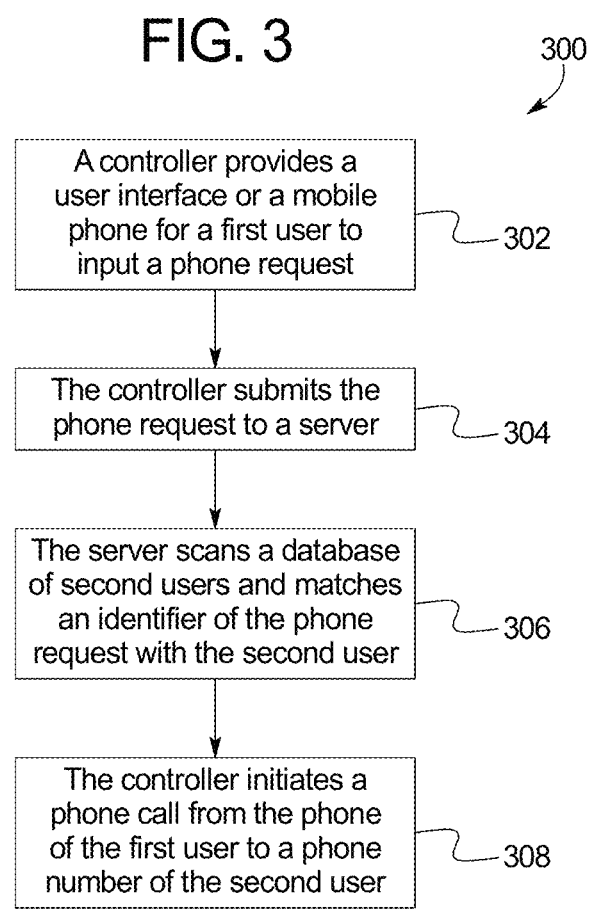
FIG. 3 is a flow chart illustrating the steps of a method of operating the system of the present invention.

FIG. 3 illustrates a method 300 of using the system 200 to place a phone call from a first user 168a to a second user 168b-168d. As shown in FIG. 3, the first step 302 includes the step in which a controller 104 provides a user interface 172 on a mobile phone 100 for a first user 168a to input a phone request. A second step 304 in which the controller 104 submits the phone request to the server 164. A third step 306 in which the server 164 scans a database 166 including records related to one or more second users 168b-168d and matches an identifier 174 provided in the phone request with a record related to a second user 168b-168d. Finally, FIG. 3 shows a fourth step 308 in which the controller 104 initiates a phone call from the phone 100 of the first user 168a to a phone number 180 associated with the second user 168b-168d. Additional steps in the method 300 providing additional features and functionality are described in relation to FIGS. 4-23.

Figure 4:
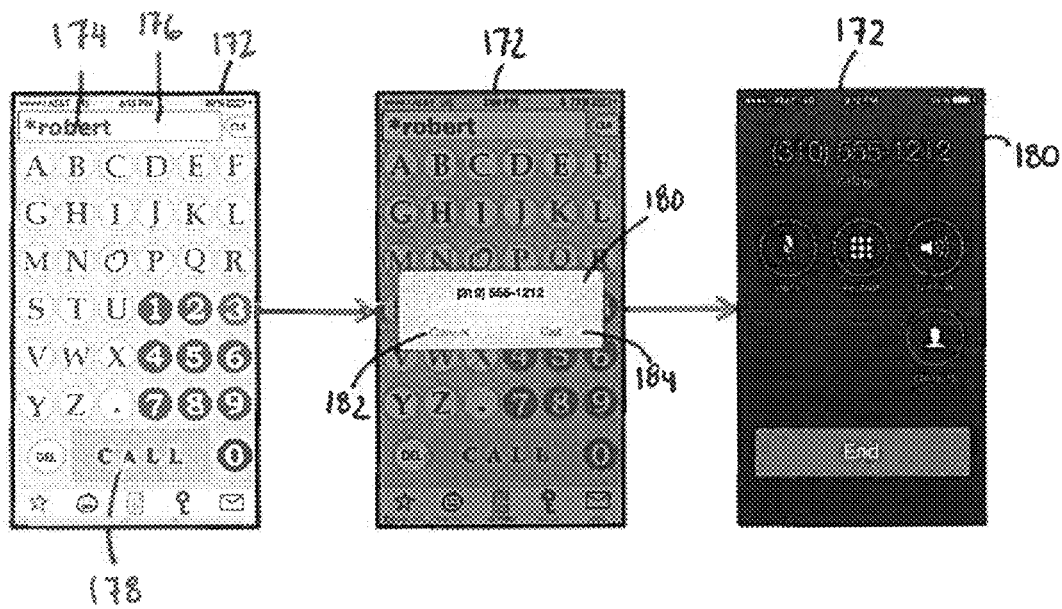
FIG. 4 is an illustration of a series of user interfaces displaying the submission of a phone call request and the initiation of a phone call.

FIG. 4 illustrates a user interface 172 of the mobile application into which a first user 168a inputs an identifier 174 of a second user 168b-168d. In this example, the first user 168a inputs Robert's identifier 174, *robert, into an input field 176 in the user interface 172 and selects the CALL button 178. The controller 104 on the mobile device 100 (e.g., phone 100) submits the phone call request to the server 164, which through the server controller 165 scans the database 166 to identify the second user 168b-168d and associated phone number that corresponds to the submitted identifier 174. The server 164 identifies the second user 168b-168d and provides the phone number of the second user 168b-168d to the controller 104 on the phone 100. The controller 104 presents the phone number 180 to the first user 168a and prompts the first user 168a to select a "cancel" button 182 or a "call" button 184. Upon selection of the "call" button 184, the mobile phone 100 dials the phone number associated with the second user 168b-168d.

Figure 5:
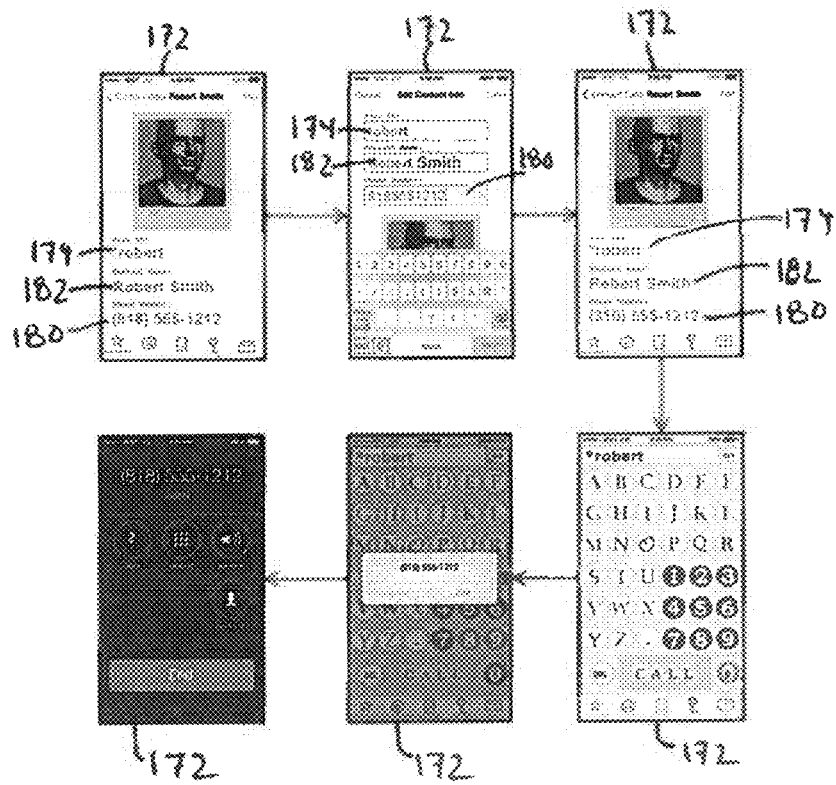
FIG. 5 is an illustration of a series of user interfaces displaying the updating of contact information of a user.

Referring to FIG. 5, the mobile application includes a user interface 172 to enable each user 168 to update his or her phone number 180 that is associated with the identifier 174. By updating the phone number 180 on the mobile application, each user 168 does not need to update friends when he or she gets a new phone number 180 or needs to be reached temporarily at a new phone number 180. Other users 168 continue to use the identifier 174 regardless of the associated phone number 180. For example, if the user 168 were visiting a remote location that does not have cell phone service, the user 168 can temporarily update the phone number 180 to be the landline number at the user's temporary location. Other users 168 continue to call the same identifier 174 (e.g., *robert 174) to reach Robert Smith 182 at the remote location.

In other embodiments, a user 168 may update information such as his phone number 180, email address, and home address, and provide the updated information to other users 168. The user 168 may provide updated information to contacts through various means, such as passively updating the information without providing a notification to other users 168, by providing an icon next to the user's name in the message center indicating that information has been updated, by sending an email notification to selected users 168, or by texting a message notification to selected users 168. In some embodiments, the user 168 may customize how he receives the updated information of other users 168.

Each user 168 may select whether his account information will be private or public. Private accounts may require a security key for other users 168 to view or obtain contact information. Public accounts do not require such security keys.

Figure 6:
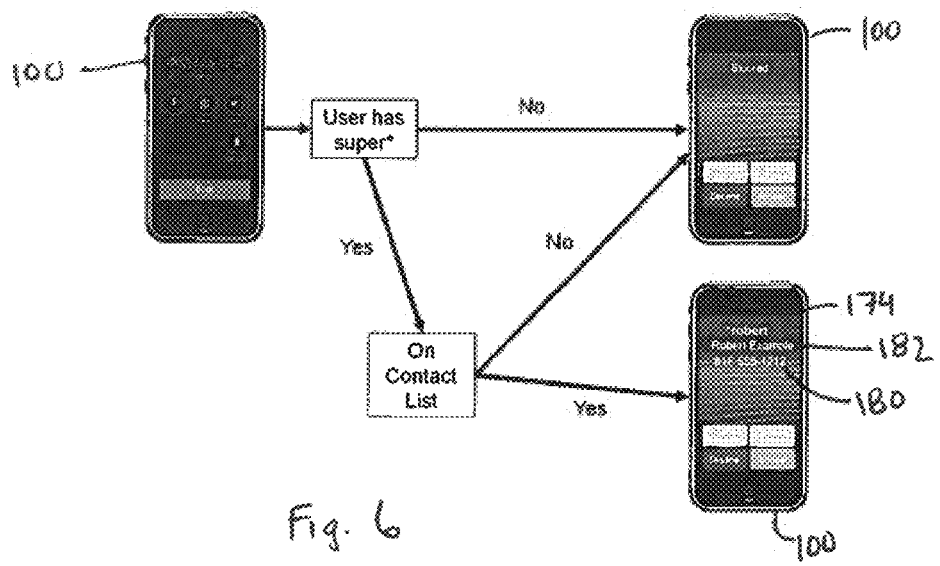
FIG. 6 is a flow chart illustrating a decision tree for determining which information may appear on a call-receiving user's phone when a phone call is initiated.

Each user 168 may maintain a contact list in the mobile application, and the information that appears on a call-receiving user's phone 100 may vary depending on whether the call-initiating user 168a is on the contact list of the call-receiving user 168b-168d. FIG. 6 illustrates an example of the information that may appear on the phone 100 when a phone call is connected. In some embodiments, when the call-receiving user 168b-168d receives a call from a call-initiating user 168a that is in the call-receiving user's contact list, information such as the identifier 174, the name 182, and/or the phone number 180 of the call-initiating user 168a appears on the call-receiving user's phone 100 as the phone call is connected. If the call-initiating user 168a is not in the call-receiving user's contact list, such information is blocked.

Figure 7:
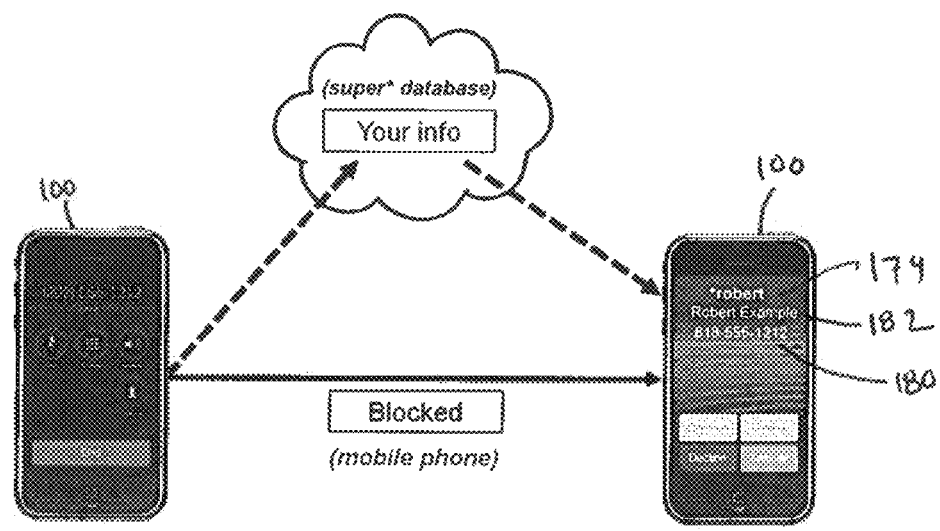
FIG. 7 is an illustration of an embodiment of a call-receiving user's phone when a phone call is initiated.
Figure 8:
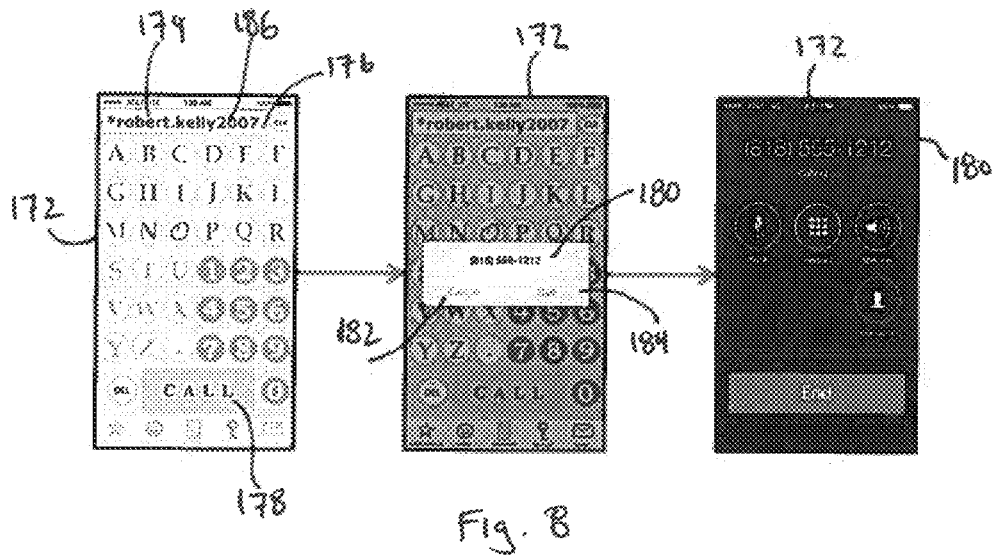
FIG. 8 is an illustration of an embodiment of a series of user interfaces displaying the submission of a phone call request with a personal key and the initiation of a phone call.

In a further embodiment, the call-receiving user 168b-168d may override the blocking feature and update his settings so that information of call-initiating users 168a that are not on the call-receiving user's contact list appears on the screen as shown in the flowchart illustrated in FIG. 7. In any embodiment, the call-initiating user may select which information of the identifier 174, the phone number 180, and/or the phone number 182, appears when a call is connected. In other embodiments, the information associated with the call-initiating user is blocked if the call-initiating user is not using the mobile application.

The system 200 also provides users 168 with the ability to use one or more personal keys 186 for each user 168 so that a call-initiating user 168a may contact a call-receiving user 168b-168d using a mobile phone 100 not previously associated with the call-initiating user 168a or the call-initiating user's contact information. Such phone call may otherwise be blocked or sent straight to voicemail because the call is coming from a number that is not on the call-receiving user's contact list. The personal key 186 communicates to a call-receiving user 168b-168d that a call is being made by a known user 168 (e.g., a friend or a family member) from a previously unknown user's mobile application. The friend or family member may be contacting the user 168 in an emergency situation and may not have access to his phone 100. The personal key 186 such as ".(username)" is added to the identifier 174 of the call-receiving user 168a-168d. In the example illustrated in FIG. 8, Robert's daughter, Kelly (age 6) is lost on a field trip and does not remember her father's cell phone number. Kelly asks a chaperone use the mobile application to submit a phone call request to *robert. Robert rejects the call because the call-initiating user's information was blocked. Kelly then adds her personal key 186, ".kelly2007", and submits a phone call request to *robert.kelly2007, and Robert answers the call because the information is not blocked. In some embodiments, each user 168 may have an unlimited number of personal keys 186.

In the embodiment illustrated in FIGS. 6 and 7, the call-initiating user's name 182, identifier 174, and phone number 180 appear on the screen of the call-receiving user's phone 100. In other embodiments, only one or two of the call-initiating's name 182, identifier 174, and phone number 180 may appear on the call-receiving user's phone 100. In further embodiments, a user 168 may have a second phone number 180 that is public while maintaining his primary phone number 180 as private so he can provide the second public phone number to unknown people. For example, a user 168, Jane, may sell items on Craigslist or eBay. She uses her primary private phone number 180 with family and friends, and obtains a second public phone number 180 to be used for her public online transactions so that she can avoid posting her private phone number 180 online. Further Jane can assign different personal keys 186 to represent different phone numbers 180. She can use the identifier 174 "*jane" for her primary private number 180. For her online sales, she can add the personal key 186 ".sales" so other users interested in her Craigslist or eBay items can contact her at "*jane.sales". When such users enter "*jane.sales" into the user interface 172, the public phone number 180 will be displayed. Jane can set up the system 200 such that calls to *jane are blocked unless the call-initiating user 168*a* is in Jane's contact list, but that all calls to *jane.sales are connected regardless of whether or not the call-initiating user 168*a* is in Jane's contact list.

Figure 9:
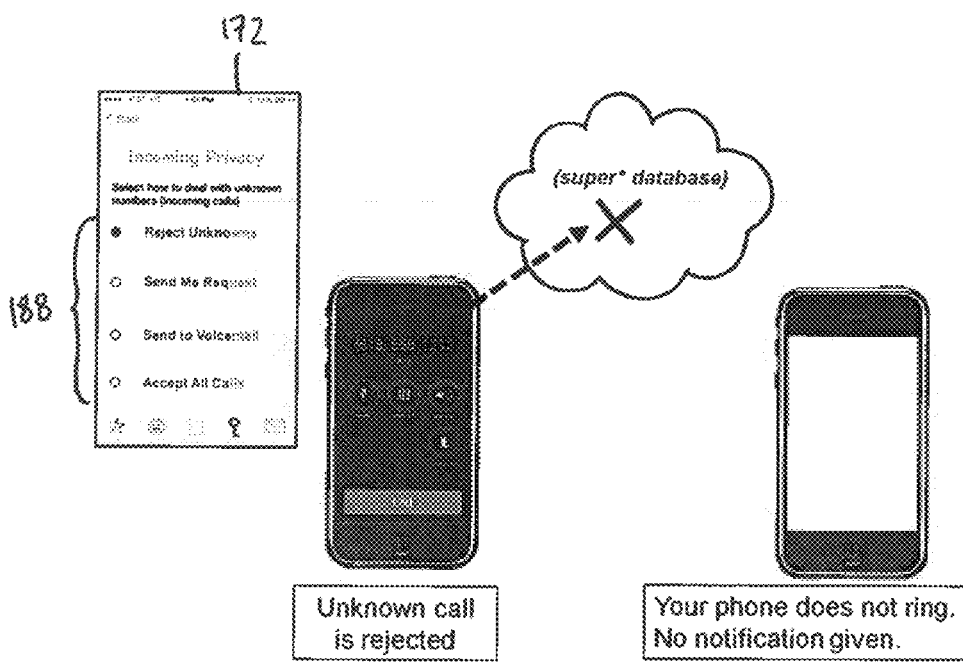
FIGS. 9-12 are examples of embodiments of user interfaces displaying options for handling unknown callers.
Figure 10:
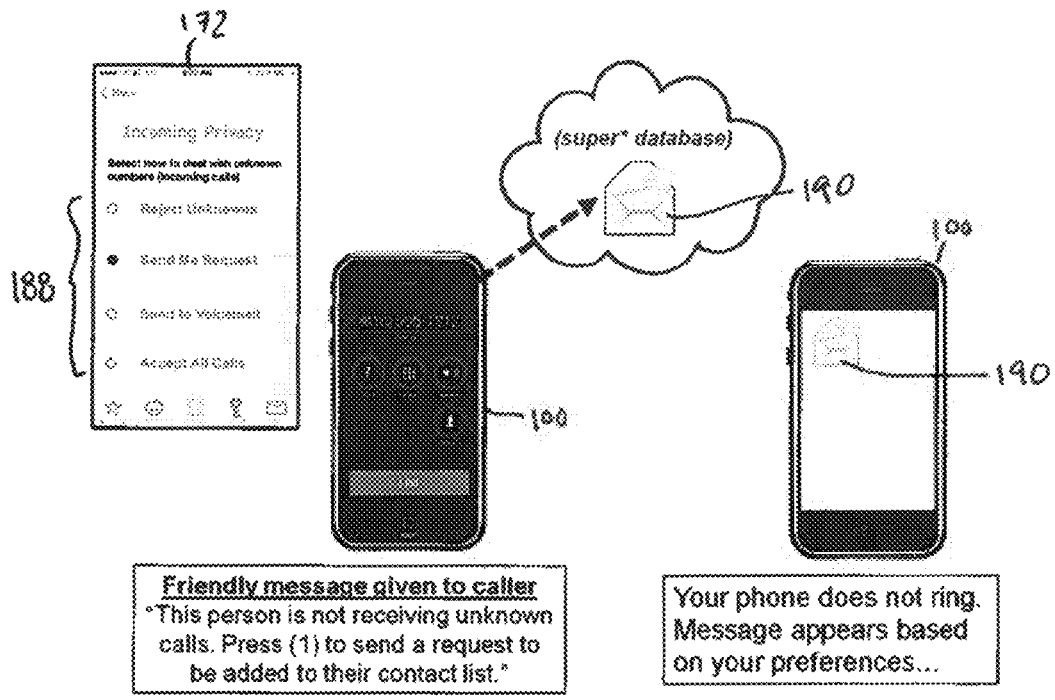
Figure 11:
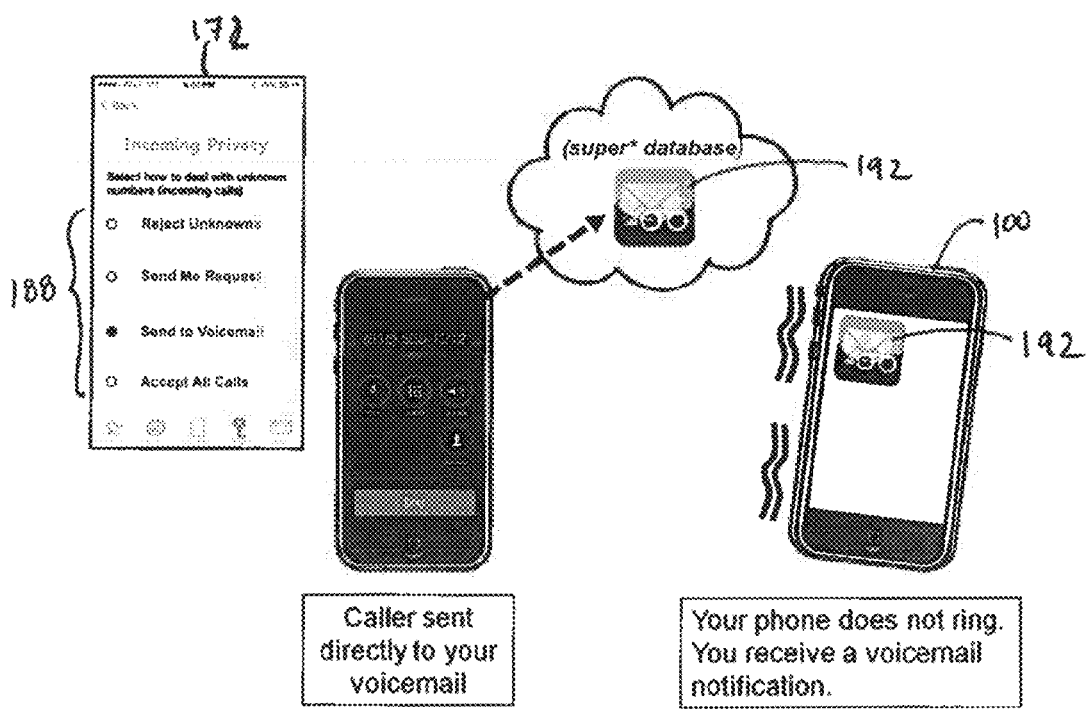
Figure 12:
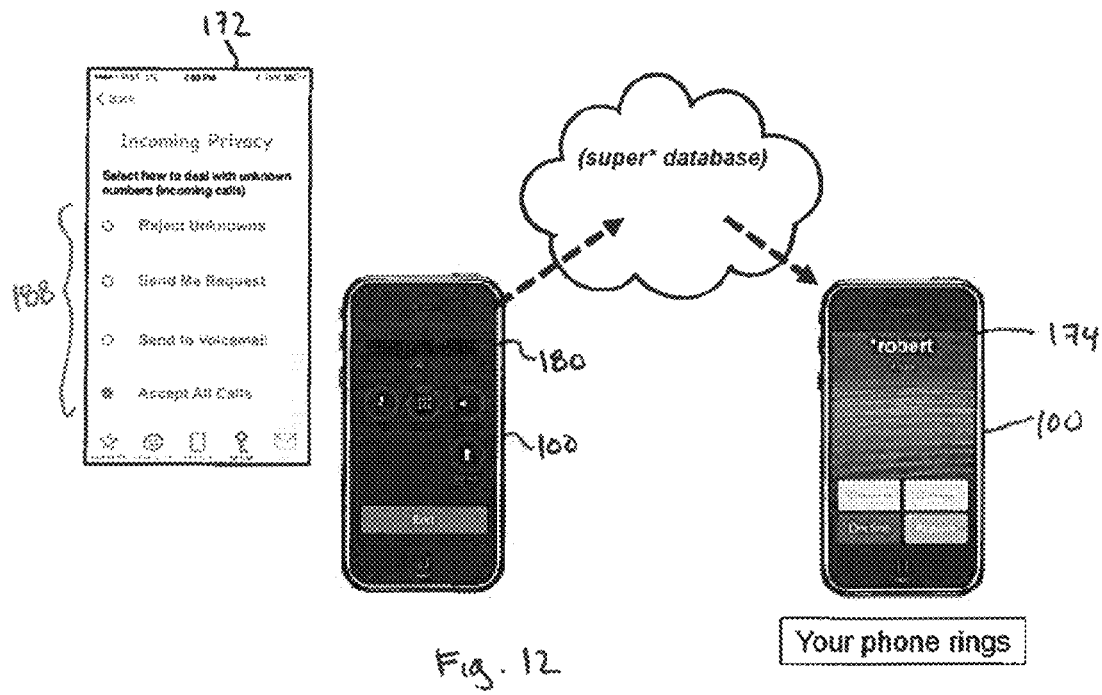

Referring to FIGS. 9-12, the system 200 provides options 188 for handling phone call requests from unknown users. The options 188 are shown in the user interface 172 illustrated in FIGS. 9-12. The user 168 may change the settings at any time to adjust how calls from unknown callers are directed. As shown in FIG. 9, there may be an option 188 in which a user 168 may reject all calls from unknown users 168. Referring to FIG. 10, there may be an option 188 in which the call may be directed to a message center 190 that gives the unknown caller the option of sending a request to be added to the user's contact list. The request may be sent to the user 168 by email, text message, automated voicemail, or message over the mobile application. As shown in FIG. 11, there may be an option 188 in which the call from the unknown user may be sent directly to voicemail 192 without ringing. As shown in FIG. 12, there may be an option 188 in which all calls from unknown users 168 may be accepted.

Figure 13:
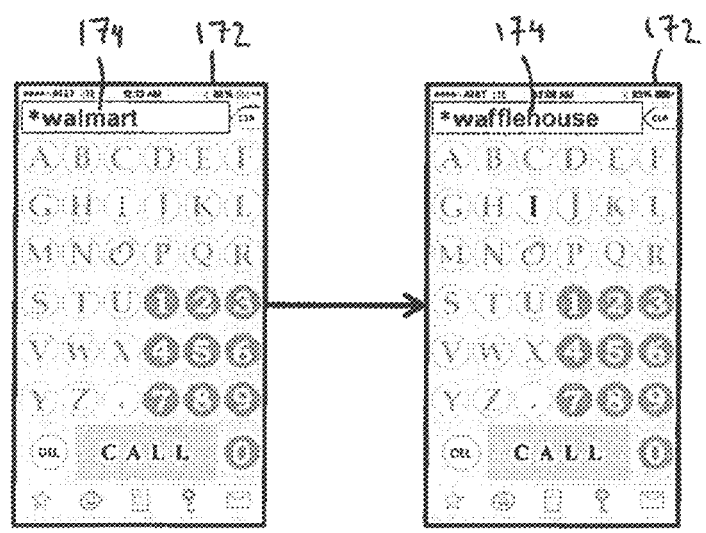
FIG. 13 is an illustration of embodiments of a series of user interfaces illustrating an auto-fill feature.

Referring to FIG. 13, the identifier 174 may be auto-filled as the user 168 inputs the identifier 174 into the user interface 172. The user interface 174 may auto-fill the identifier 174 based on how often the identifier 174 is used by that user 168 or the entire user base. In the example illustrated in FIG. 13, the user 168 is attempting to call the closest Waffle House. As the user enters the first two letters of the identifier 174 (i.e., "wa"), the identifier 174 "*walmart" is auto-filled because the user 168 calls Walmart often. As the user 168 continues to enter the identifier 174 by adding an "f," the auto-completed identifier 174 changes from "*walmart" to "*wafflehouse".

Figure 14:
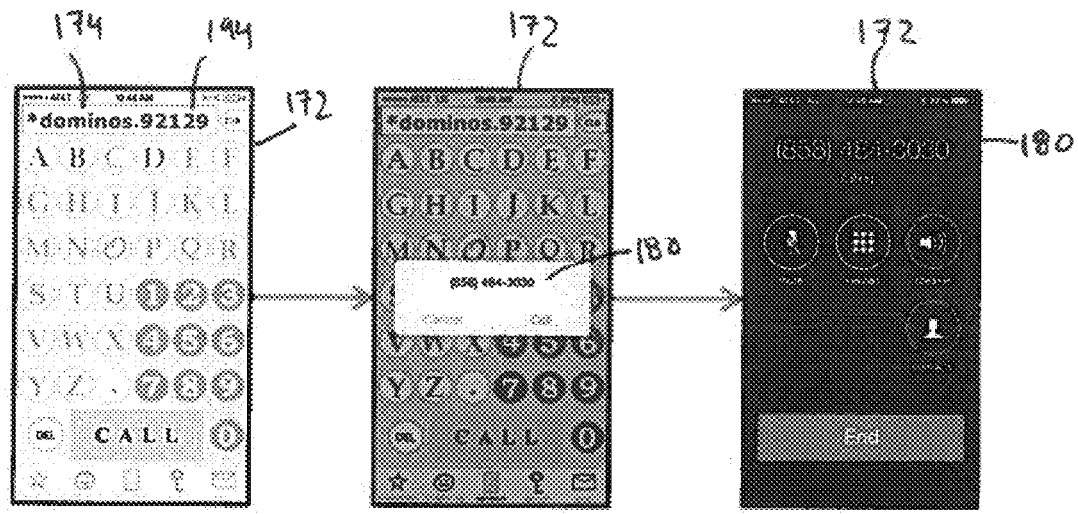
FIG. 14 is an illustration of embodiments of a series of user interfaces illustrating the use of a location key.
Figure 15:
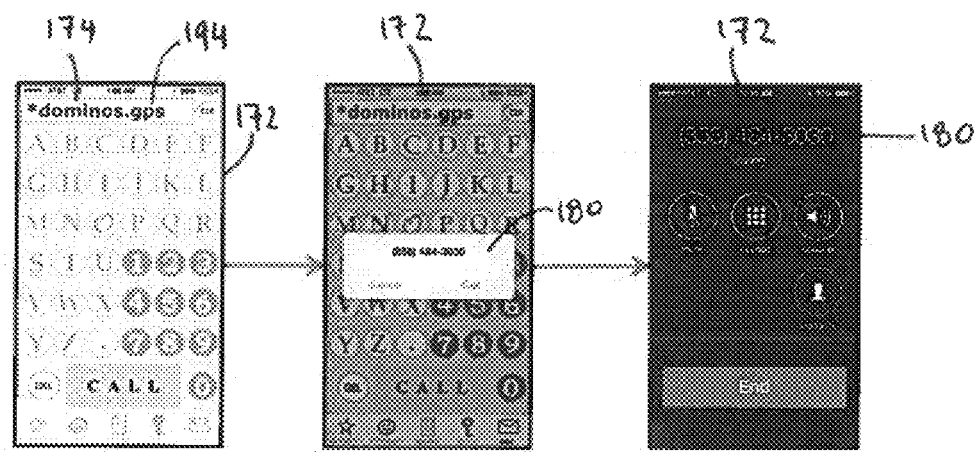
FIG. 15 is an illustration of embodiments of a series of user interfaces illustrating the use of a location key based on the global positioning system of the call-initiating user's phone.

While the personal key 186 may be used to enable users 168 to use unknown mobile devices 100 to reach call-receiving users 168*b*-168*d*, as described above, variations of personal keys 186 may be used to identify franchises or departments within a business. For example, Domino's Pizza is a large pizza franchise with more than 10,000 locations in the United States. Rather than using a different identifier 174 for each location, a location key 18 could be used with a common identifier 174 (or base identifier 174) to distinguish between locations. The common identifier 174 may be "*dominos" and the location key 194 may be the zip code of each location. FIG. 14 shows a user calling a Domino's pizza franchise located in the 92129 zip code by entering *dominos.92129.

Figures 16, 17:
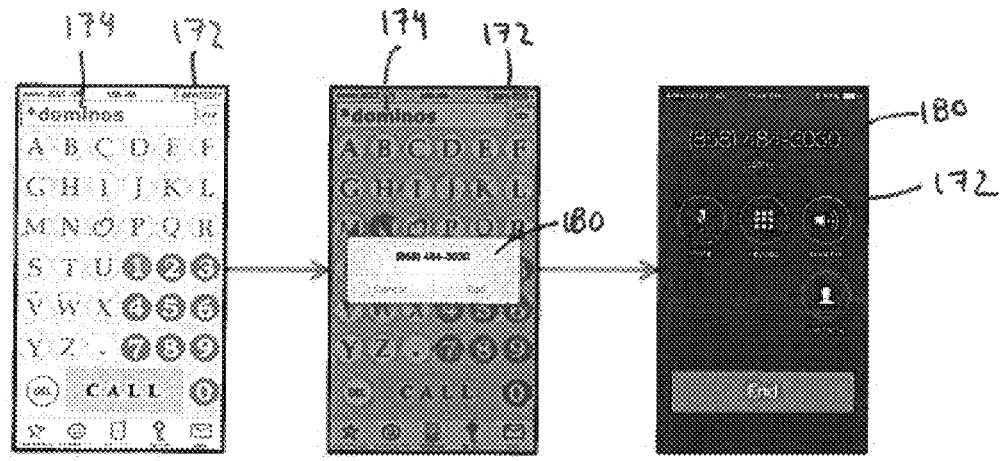
Figure 20:
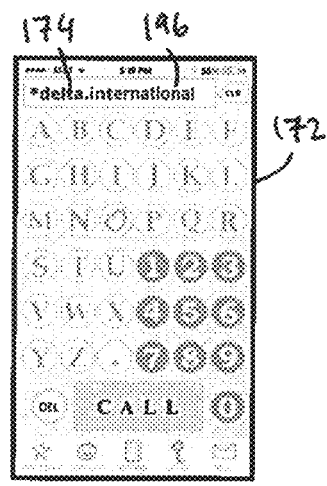
FIG. 20 is an illustration of an embodiment of a user interface illustrating the use of a department as an extension key with the auto-fill feature.
Figure 21:
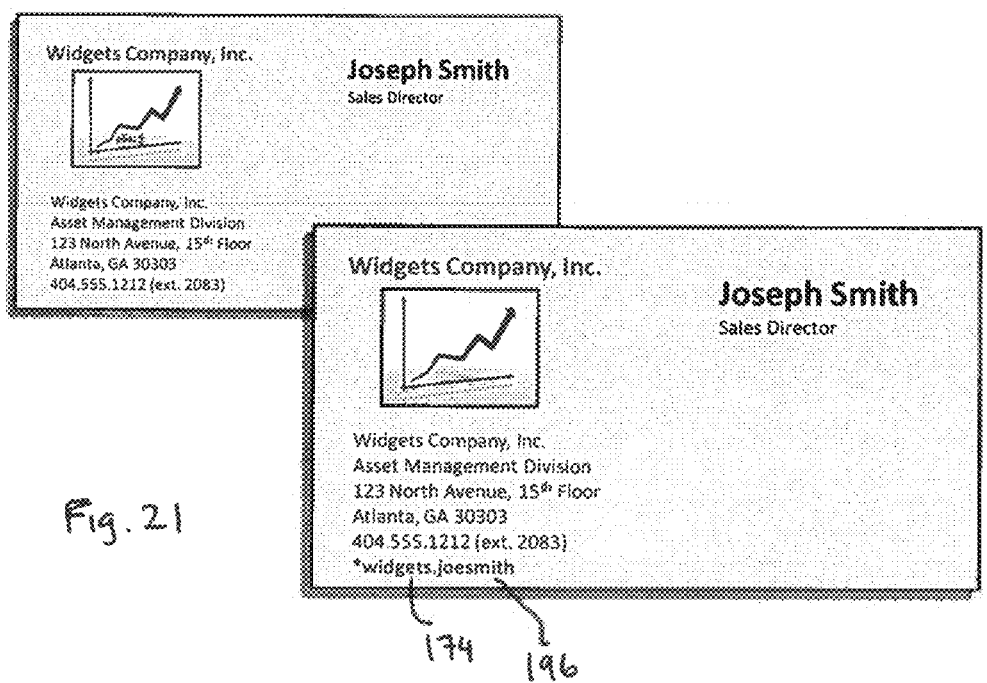
FIG. 21 is an illustration of business cards illustrating the use of an identifier and extension key.
Figure 22:
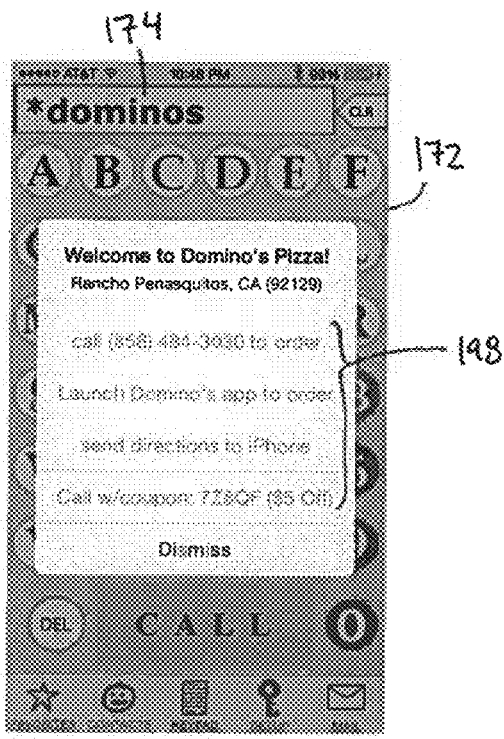
FIG. 22 is an illustration of an embodiment of a list of options for a business presented to a user in response to the initiation of a phone call to a business.

In a further embodiment, using a common identifier 174 in combination with the location key 194 ".gps" allows a user to utilize the global positioning service (e.g., 1x positioning sensor 112 and GPS/navigation instructions 156) on her mobile phone 100 to contact a location specific phone number 180. This technique may be used, for example, to call the nearest location of a franchise business or other business with many locations. In response to receiving the common identifier 174 and the location key 194 ".gps", the controller 104 uses the global positioning service on the mobile phone 100 to identify the current location of the mobile phone 100 and communicate the location to the server 164 which queries the database 166 to use the location information to find the appropriate contact information for the correct location-based call-receiving user 168*b*-168*d*. The appropriate location specific contact information is communicated from the server 164 to the mobile phone 100, and the controller 104 on the phone 100 initiates the phone call. For example, in the example illustrated in FIG. 15, the user enters "*dominos.gps" to call the nearest Domino's location. It is contemplated that businesses with multiple locations may set the system 200 to respond to the common identifier 174 to redirect to the identifier.gps, as shown in FIG. 16.

Extension keys 196 may also be used to identify contact information for specific departments of large businesses. For example, each department may be called directly at "*business.department". As an example, a list of Delta Airline's departments with respective phone numbers is provided in FIG. 17. A list of Delta Airline's departments with respective identifiers 174 and extention keys 196 is shown in FIG. 18. To reach the Spanish-speaking reservations department with Delta Airlines, a user 168 may use the combination of the identifier 174 and extension key 196 "*delta.spanish" to call them directly, as shown in FIG. 19. Users 168 are more likely to recall the extension key 196 of a specific department rather than the phone number of a specific department. The extension keys 196 may also be auto-filled as described above and shown in FIG. 20, in which the user has entered *delta.in and the user interface 172 auto-completes to *delta.international.

In addition to departments of corporations, extension keys 196 may be used to allow direct access to specific employees at a company or other organization. For example, an employee of a company may provide a business card that includes the identifier 174 and extension key 196 of "*company.employeename" to potential customers. In the example illustrated in FIG. 21, Joe Smith works at Widgets Company, Inc. His business card includes his identifier 174 plus extension key 196 as "*widgets.joesmith". The extension key 196 of an employee may be combined with additional personal keys 174 to provide security. For example, Joe Smith may direct calls to "*widgets.joesmith" to his administrative assistance, but allow calls from his son using the combination of the identifier 174 and personal key 196 "*widgets.joesmith.son" directly to his office.

The example provided below illustrates the uses of the system 200 where a user 186 contacts a number of businesses as he proceeds on a trip to Los Angeles. Rather than searching the Internet for phone numbers 180 of businesses, the user 186 merely uses the identifiers 174 of various businesses in the system 200 as needed.

Task 1: Check Your Flight
Call up Delta Airlines to check on the flight status of Flight 2355.
Use the system 200 to check on flight: Dial: *delta.flight2355
Task 2: Make Last Minute Change to Car Rental
Call up Avis desk at Los Angeles airport to change reservation from sedan to SUV
Use the system 200 to call Avis at LAX airport: Dial: *avis.lax
Task 3: Call JW Marriott to Switch Locations
Change hotel location from Santa Monica to Downtown Los Angeles
Use the system 200 to contact JW Marriott: Dial: *jwmarriott.lax
Task 4: Make Dinner Reservations
Call up Nobu in Hollywood to make reservations
Use the system 200 to call Nobu in Hollywood: Dial: *nobu.lax
It turns out, they are full. So, we need to find another Asian restaurant near Hollywood
Task 5: Find Another Restaurant Near Hollywood, Calif.
With the system 200, you have the ability to link to online databases such as Urbanspoon.
Use the system 200 to find a good Asian restaurant in Hollywood: Dial: *food.asian.hollywood.ca As shown in Task 5, the system 200 may provide the ability to access online databases or otherwise access mobile content or Internet-based content. In the example shown in FIG. 22, a user 186 submits a phone request to a business and, in response, receives a list of options 198 of how to proceed, including calling the business, launching the business's mobile application, sending directions from the user's current location to the business, calling the business with a coupon, and canceling the call. The list of options 198 may also include the name and location of the business. The information and options provided in the list of options 198 may be customized by the business. Other possible option in the list of options 198 may include linking to menus or reviews.

Figure 23:
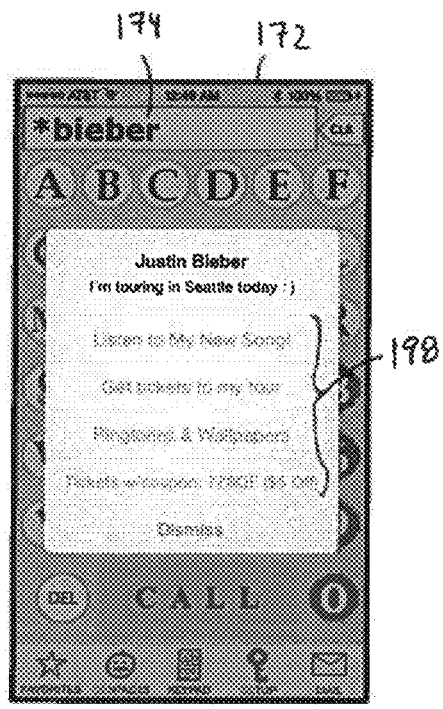
FIG. 23 is an illustration of an embodiment of a list of options presented to a user in response to the initiation of a phone call to a celebrity.

Other advertising opportunities exist as well. For example, celebrities may promote revenue streams such as selling tickets to shows or downloadable music. The list of options 198 provided to the user 168 in response to the musician's identifier 174 may be fully customizable by the musician. FIG. 23 illustrates a list of options 198 presented to a user 186 in response to using the identifier "*bieber". Other possible options include links to concert set lists or song lyrics. In one embodiment, the musician may set the settings such that any users 186 on the musician's contact list may call him using the identifier 174, while any users 186 not on his contact list receive the list of options 198 in response to using the identifier 174. Other personal keys 186 may provide different access to the musician. For example, the musician may give a personal key 186 to specific people, and control their access to the musician through the settings available in the system 200. In each of FIGS. 22 and 23, in response to receiving the identifier 174 and any personal keys 186, the server 164 accesses the database 166 and determines what response to make to the user 186. In some instances, the response is to initiate a phone call. In others, it is to access online information, websites, etc.

Figure 24:
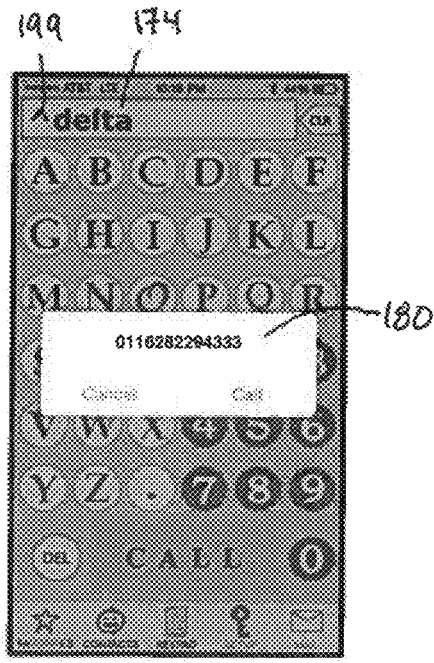
FIG. 24 is an illustration of an embodiment of a user interface in which a unique prefix is used to designate a country code with which an identifier is to be used to place a phone call.

The system 200 may further provide for international phone calls to be initiated using a specific prefix 199 as part of the identifier 174. In one embodiment, the prefix 199 of the identifier 174 may correspond to the country of the call-receiving user 186b-186d. In the examples provided herein, the "*" prefix 199 indicates that the call-receiving user 186b-186d has a corresponding phone number with a U.S. country code. Other prefixes 199 such as "?" or "^" may correspond to other countries. FIG. 24 illustrates the input of a prefix 199 and identifier 174 of a call-receiving user 186-b-186d located in a country with a country code of "011" based on the prefix 199 "^".

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for connecting with users comprising:
a database including records related to one or more second users, each of the second users being associated with an identifier, data, and a plurality of contact lists, wherein the data includes a plurality of data subsets, each data subset associated with each one of the plurality of contact lists;
a phone including a controller in communication with the database; and
a memory in communication with the controller, the memory including program instructions executable by the controller that, when executed by the controller, cause the controller to:
provide a user interface that receives a phone call request from a first user, wherein the phone call request includes the identifier associated with a one of the second users and does not include the phone number associated with the one of the second users, and wherein the first user is on one of the plurality of contact lists of the one of the second users;
in response to receiving the phone call request, initiate the phone call over a telephone network from the phone to the phone number associated with the one of the second users, and
receive one data subset of the plurality of data subsets associated with the contact list of the one of the second users that includes the first user.

2. The system of claim 1, wherein the database further includes one or more personal keys associated with one or more of the first and second users.

3. The system of claim 1, wherein the database includes an identifier for a business having a plurality of locations and one or more location keys corresponding to each of the plurality of locations.

4. The system of claim 3, wherein each location key is a zip code associated with each location.

5. The system of claim 3, wherein the controller communicates with a global positioning system subsystem (GPS subsystem) of the phone, in response to receiving the identifier associated with the business having a plurality of locations the controller automatically includes a location key associated with a GPS location identified by the GPS subsystem in the phone call request, and in response to receiving the phone call request including the location key, the controller initiates a phone call from the phone to a phone number associated with the business location associated with the location key.

6. The system of claim 1, wherein the controller is in communication with a second user contact list for each of one or more of the second users, each of the second user contact lists including identifiers of a subset of the first and second users, wherein initiating the phone call further includes the controller blocking the identifier of the first user from the second user if the first user is not in the second user contact list associated with the one of the second users to which the call is directed.

7. The system of claim 1, wherein the phone is in communication with the database via a wireless communication network.

8. A method of connecting with users, comprising:
providing a system comprising:
- a database including records related to one or more second users, each of the second users being associated with an identifier, data, and a plurality of contact lists, wherein the data includes a plurality of data subsets;
- a first phone including a first controller in communication with the database; and
- a second phone including a second controller in communication with the database;

receiving a phone call request from a first user, wherein the phone call request includes the identifier of the associated with one of the second users and does not include the phone number associated with the one of the second users, and wherein one of a first contact list and a second contact list of the plurality of contact lists of the one of the second user includes the first user;

if the first contact list includes the first user, initiating the phone call over a telephonic network from the first phone to the phone number of the one of the second users;

if the second contact list includes the first user, receiving a data subset of the plurality of data subsets associated with the second contact list of the one of the second users on the first phone.

9. The method of claim 8, further comprising the step of updating the phone number associated with the one of the second users.

10. The method of claim 8, wherein the controller is in communication with a second user contact list for each of one or more second users, each of the second user contact lists including identifiers of a subset of the first and second users, further comprising the step of providing the identifier of the first user to the second user after the initiating connecting step if the first user is on the second user contact list.

11. The method of claim 10, further comprising the step of blocking the identifier of the first user to the second user after the connecting step if the first user is not on the second user contact list.

12. The method of claim 11, wherein an additional user has a personal key, wherein the phone call request further includes the identifier of the first user and the personal key of the additional user, and further comprising the step of providing the identifier of the first user to the second user after the connecting step if the additional user is on the second user contact list.

13. The method of claim 1, wherein the data subset includes an advertisement.

14. The method of claim 1, wherein the data subset includes one of contact information, a link to a website, and a link to a further data subset.

* * * * *